6789X
P. Chase,
Steam-Boiler Furnace,
Patented Oct. 7, 1831.
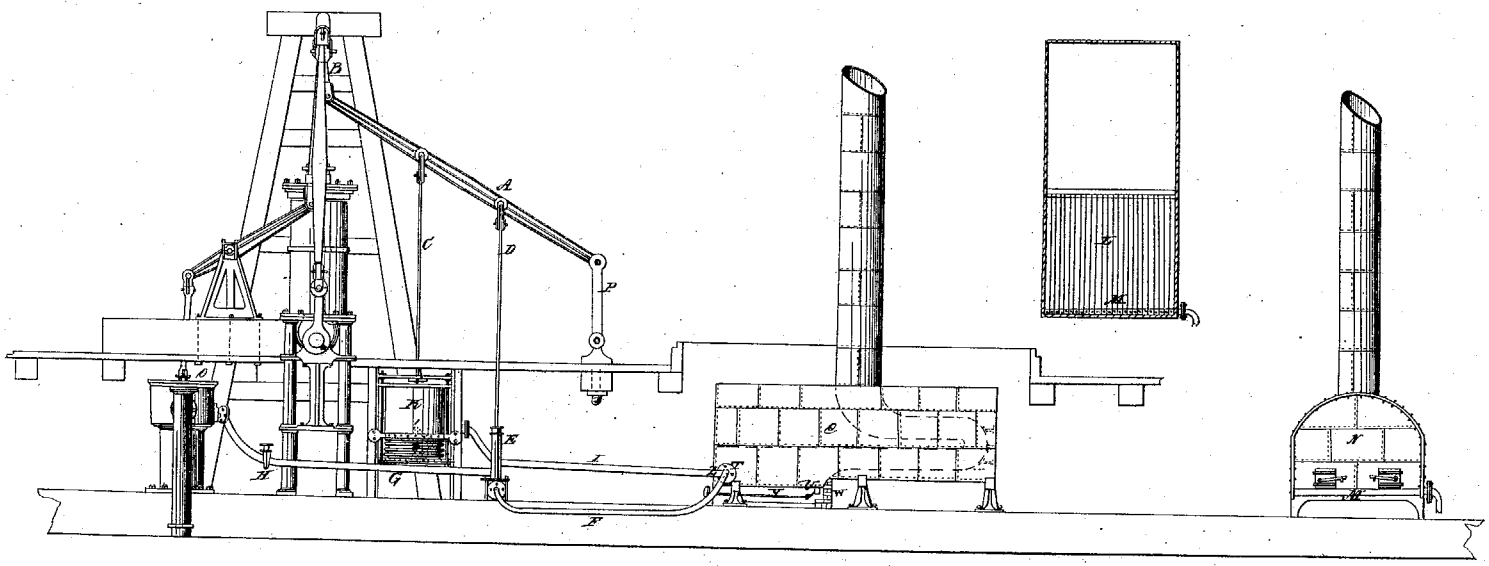
N. PETERS, PHOTO-LITHOGRAPHER, WASHINGTON, D. C.

Oct 7, 1831 6789X [illegible]

Paul Chase.

Letters Patent

The schedule referred to in these Letters Patent and making part of the same
containing a description in the words of the said Paul Chase himself of his improvement
in the mode of applying high Steam & Hydrogen Gas, to aid in producing combustion in
the use of Anthracite coal.

Description of an Invention to apply high Steam and Hydrogen Gas to aid in
producing combustion in the use of anthracite Coal.
This is done by two or more tubes or cylinders placed sufficiently near the grate
bars in the furnace of steam boilers, which being heated by the same fire & sup-
plied with water by a force pump, the water is instantly converted into Hydrogen
or inflammable gas, which is taken by the increased draft supplied by the hinge
flue, (hereafter described) and united with caloric produces sufficient flame to extend
thro' the flues of a steam boiler or steam generator
The hinge flue is intended to be placed on the inner part of the grate bars
for the purpose of creating sufficient draft, to increase the consumption of Oxygen
& quicken combustion in the use of Anthracite Coal,
The water pans are so constructed in the bottoms (the construction of the
bottoms is only claimed) to produce action in the water placed in them, to unite in
effect with the above described tube or tubes or gas generators to accelerate this
operation, New York 26 March 1831.
Description of the hinge Flue, mentioned in the [illegible] plan,
The flue is made in the front wall of the furnace two inches wide extending across
the wall. A like space is made in the wall under the grate bars, through which
the air passes into the flue, an iron door is placed with hinge at the top of the
flue set in brick work, by which the flue is opened & shut as occasion may re-
quire
The water Pans. The water pans have rods of iron
placed two inches above the bottom and five inches apart, which are intended to
agitate or produce action in the water while the boat or vessel is in motion.
I place full & entire reliance upon the effect of the water in producing

[illegible]

combustion & expansion of heat in steam boilers, and in all cases where Anthracite coal is used for other purposes. The Compound Blow Pipe or air pump is considered useful to unite with the water in producing the same effect where the draft is not sufficient.

Discription of the Compound Blow Pipe. or Force Pump. K.

mentioned in the annexed plan. The upper & lower ends of it are made of wood to be of a circular form, of the size or diameter of the cylinder of the steam engine and of the length of the piston rod, at the middle of the pump, that is to say equidistant from the ends, it is fixed to the guide rods, as represented in the plan, C. is fastened to a cross head, being the upper part of the frame & is connected with the lever beam for which the motion is obtained, a pipe I leads from one side to a point equidistant ~~distant~~ from each end as represented in the plan to point Z. and the covering or outside of the pump is made of leather supported by four wooden rings at equal distances from the ends and from each other as represented by the letter K.

The compound Blow Pipe or force Pump is to be placed in an iron frame as represented in the side view. C. represents the rod connecting the pump with the lever beam, from which the motion up & down is obtained; the frame is fastened at the bottom, two iron rods one on each side of the pump fastened at the bottom run thro' the middle partition, which is also of wood & the top or upper end of the pump & are fastened to the cross head so as to play freely, the upper half or section of the pump from which pipe I proceeds operating as a reservoir.

At the rise of the lever beam A the bottom of the pump is lifted up & the air carried from its lower section thro' the valve No. 1. in the middle partition into pipe I. & fills at the same time the upper section of the pump or reservoir K with the down stroke of the lever beam A. the valve No. 1 is closed, and the air in the upper section or reservoir is carried forward into pipe I, which continues the blast. The same down stroke fills the lower section at valve No. 2 and is continued by every operation of the lever beam A carrying forward air to point Z, being the point of contact for air & water & is calculated to carry eight parts air to twenty in the hundred of water which unite at point Z, and are carried into retort. M.

The retort M. is three inches in diameter, made of wrought, sheet or cast iron, and placed under the grate bars, with holes between the grate

6184X

[illegible] from which the decomposed air and water escape in Hydrogen gas or high steam, the gas is taken up by the draft into the body of ignited Anthracite coal and produces combustion and expansion of heat, which is carried thro the flues of the steam boiler. The diameter of all the holes in the retort M. thro which the gas is to escape must, taken together, be equal to the diameter of the retort itself.

The drawing fully explains the principle of the improvement, The application of it must vary according to the position of the Engine & Boiler to which it may be applied. The air pump is considered useful in cases where there are a deficiency in the draft.

The force pump for water is known to all engineers and a description of it is deemed unnecessary. It may be placed as represented in the drawing rod D, being the connecting power, Paul Chase.

Witnesses
Wm. Talmage
Robt. Giles Jun.

Exd.
ClfW.

1045 [illegible]